US007182907B2

(12) United States Patent
Shimizu et al.

(10) Patent No.: US 7,182,907 B2
(45) Date of Patent: Feb. 27, 2007

(54) METHOD FOR MANUFACTURING A KEY TOP MEMBER FOR PUSH BUTTON SWITCH STRUCTURE

(75) Inventors: Takao Shimizu, Saitama (JP); Satoshi Mieno, Saitama (JP); Tsutomu Nagasawa, Saitama (JP); Yoshinari Shizukuda, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 0 days.

(21) Appl. No.: 10/465,340

(22) Filed: Jun. 18, 2003

(65) Prior Publication Data

US 2003/0213683 A1 Nov. 20, 2003

Related U.S. Application Data

(62) Division of application No. 09/714,904, filed on Nov. 16, 2000, now Pat. No. 6,621,027.

(30) Foreign Application Priority Data

Nov. 19, 1999 (JP) ................................ 11-330094

(51) Int. Cl.
*B29C 51/10* (2006.01)
*B29C 39/12* (2006.01)

(52) U.S. Cl. ...................... 264/554; 264/135; 264/246; 264/255; 264/267

(58) Field of Classification Search ................ 264/135, 264/554, 255, 246, 267
See application file for complete search history.

(56) References Cited

U.S. PATENT DOCUMENTS

| | | | | |
|---|---|---|---|---|
| 5,198,283 | A * | 3/1993 | Hausler et al. | 428/195.1 |
| 5,234,744 | A * | 8/1993 | Kenmochi | 428/195.1 |
| 5,288,221 | A | 2/1994 | Stoerr et al. | |
| 6,023,033 | A | 2/2000 | Yagi et al. | |
| 6,084,190 | A | 7/2000 | Kenmochi | |
| 6,196,738 | B1 | 3/2001 | Shimizu et al. | |
| 6,278,072 | B1 | 8/2001 | Nakajo | |
| 6,455,796 | B2 | 9/2002 | Kashino | |

FOREIGN PATENT DOCUMENTS

| | | |
|---|---|---|
| EP | 0 130 424 B1 | 7/1989 |
| EP | 0 977 225 A2 | 2/2000 |
| GB | 2 279 915 A A2 | 7/1993 |
| JP | 60-21236 | 2/1985 |
| JP | 6-044859 | 2/1994 |
| JP | 08-115634 | 5/1996 |
| JP | 9-237543 | 9/1997 |

(Continued)

*Primary Examiner*—Edmund H. Lee
(74) *Attorney, Agent, or Firm*—Lerner, David, Littenberg, Krumholz & Mentlik, LLP

(57) ABSTRACT

A key top member for a push button switch structure capable of facilitating change and modification of a design while eliminating deformation and misregistration of a display section, being accommodated to a variety of data, being increased in design properties and visibility, and being reduced in manufacturing cost. An upper resin sheet made of thermoplastic resin and having display sections such as a letter, a symbol, a pattern or the like printed thereon is formed with projections having configurations conforming to outer configurations of key top elements. The projections are each securely provided therein with a filler member made of photo-setting resin directly or through an adhesive.

8 Claims, 5 Drawing Sheets

FOREIGN PATENT DOCUMENTS

| | | | | |
|---|---|---|---|---|
| JP | 10-119058 | A | * | 5/1998 |
| JP | 11-176274 | A | * | 7/1999 |
| JP | 11-224561 | | | 8/1999 |
| JP | 11-297149 | | | 10/1999 |
| JP | 2000-40434 | | | 2/2000 |

* cited by examiner

METHOD FOR MANUFACTURING A KEY TOP MEMBER FOR PUSH BUTTON SWITCH STRUCTURE

CROSS-REFERENCE TO RELATED APPLICATIONS

The present application is a divisional of U.S. application Ser. No. 09/714,904 filed Nov. 16, 2000 now U.S. Pat. No. 6,621,027.

BACKGROUND OF THE INVENTION

This invention relates to a key top member for a push button switch structure suitable for use for a data input device, a switch device or the like for mobile communication equipment such as a mobile phone or a car phone, a home telephone, an electronic notebook, a measuring instrument, a vehicle mounted-switch, a remote control, a computer, a personal computer, or the like, and a method for manufacturing the same, and more particularly to a key top member for a push button switch structure which permits a display section such as a symbol, a letter, a pattern or the like printed on a sheet to exhibit enhanced design characteristics and durability and is used for a back-lighted push button switch structure as well.

In general, a push button switch structure for equipment such as mobile communication equipment like a mobile phone, an electronic notebook, a measuring instrument, a remote control or the like is so constructed that a key top member or a cover having key top elements arranged thereon is mounted on a circuit board received in a casing of the equipment, to thereby function as a switch structure for carrying an ON-OFF operation of a circuit of the equipment. Such a push button switch structure typically has a key top member incorporated therein, which is formed of thermoplastic resin into a predetermined configuration by injection molding. Recently, it has been demanded to apply a variety of designs such as a symbol, a pattern and the like to the key top by printing. This is carried out by in-mold techniques or insert molding of applying a variety of designs to a resin sheet by printing, interposedly incorporating the printed resin sheet in a mold for injection molding of a key top and then carrying our drawing of the printed resin sheet concurrently with molding of the key top by means of a pressure of resin being injected rather than techniques of directly subjecting a key top to printing.

Unfortunately, such in-mold forming or injection molding requires an expensive mold for injection molding which is constructed to have a special structure. Also, it causes molding conditions to be severe, leading to a deterioration in productivity and causes a material for the molding to be subjected to a restriction, resulting in an increase in manufacturing cost. For example, the injection molding is carried out while keeping the printed resin sheet placed in the mold, therefore, the printed resin sheet is required to exhibit enhanced heat resistance. Also, the in-mold forming or injection molding requires to provide the mold with an injection gate for each of portions of the printed resin sheet to be subjected to drawing. More specifically, it is required to provide the mold with at least one gate for every configuration of key top elements constituting the key top to be molded. Thus, formation of a plurality of key top elements by molding causes the mold to be expensive and complicated in structure. Also, it is required to inject molten resin for drawing of the printed resin sheet at a high temperature under an increased pressure while adjusting injection conditions for the gates in association with each other. This requires to precisely control temperature conditions, pressure conditions and the like for each of the resin and mold.

Further, in the in-mold forming or injection molding, a portion of the printed resin sheet to be positioned on each of the key top elements is extended by the molten resin, to thereby cause a configuration of a design previously formed on the printed resin to be deformed or shifted, leading to a deterioration in aesthetic properties of the key top finished.

SUMMARY OF THE INVENTION

The present invention has been made in view of the foregoing disadvantages of the prior art.

Accordingly, it is an object of the present invention to provide a key top member for a push button switch structure which is capable of being readily manufactured at a reduced cost while having a printed resin sheet interposedly incorporated therein.

It is another object of the present invention to provide a key top member for a push button switch structure which is capable of being inexpensively and readily manufactured without requiring an expensive injection mold.

It is a further object of the present invention to provide a key top member for a push button switch structure which is capable of exhibiting highly enhanced quality.

It is still another object of the present invention to provide a method for manufacturing a key top member for a push button switch structure which is capable of readily providing a key top member attaining the above-described objects.

In accordance with one aspect of the present invention, a key top member for a push button switch structure including at least one key top element is provided. The key top member includes a resin sheet having at least one display section printed thereon and provided with at least one projection having a configuration conforming to an outer configuration of the key top element. The key top member also includes at least one filler member made of photosetting resin and securely arranged in the projection, to thereby constitute the key top element in cooperation with the projection.

In a preferred embodiment of the present invention, the printed resin sheet acts as an upper resin sheet. The key top member further includes a lower resin sheet securely arranged under the upper resin sheet and filler member through an adhesive. The lower resin sheet may be unfigured or has display sections arranged thereon. The filler member is surrounded by the upper and lower resin sheets while being vertically interposed therebetween.

In a preferred embodiment of the present invention, the lower resin sheet has at least one display section formed thereon in a manner to be different from the display section of the upper resin sheet.

In accordance with this aspect of the present invention, a key top member for a push button switch structure which includes at least one key top element is provided. The key top member includes an upper resin sheet formed to be unfigured and provided with at least one projection having a configuration conforming to an outer configuration of the key top element, at least one filler member made of photosetting resin and securely arranged in the projection, and a lower resin sheet securely arranged under the upper resin sheet and filler member through an adhesive. The lower resin sheet has at least one display section such as a letter, a symbol, a pattern or the like printed thereon. The filler member is surrounded by the upper and lower resin sheets while being vertically interposed therebetween, to thereby constitute the key top element in cooperation with the projection.

In a preferred embodiment of the present invention, the lower resin sheet is provided thereon with at least one microprojection adapted to press an electrical contact of the push button switch structure.

In accordance with another aspect of the present invention, a method for manufacturing a key top member for a push button switch structure which includes at least one key top element is provided. The method includes the steps of forming a resin sheet having at least one display section printed thereon with at least one projection having a configuration conforming to an outer configuration of the key top element; and securely arranging a filler member made of photo-setting resin in the projection to constitute the key top element in cooperation with the projection.

In a preferred embodiment of the present invention, the resin sheet includes a thermoplastic resin sheet which has a plurality of the display sections previously printed thereon so as to conform to outer configurations of the key top elements. The forming the thermoplastic resin sheet with the projections is carried out by stretching portions of the resin sheet other than portions thereof which correspond to top surfaces of the projections at which the display sections are arranged substantially without stretching the portions corresponding to the top surfaces, to thereby prevent deformation of the display sections printed and misregistration thereof.

In a preferred embodiment of the present invention, the arranging of the filler member includes pouring photo-setting resin in the projection after forming the resin sheet with the projection, and exposing the photo-setting resin to light, to thereby securely cure the photo-setting resin in the projection.

In a preferred embodiment of the present invention, the method further includes the step of arranging an additional resin sheet under the cured photo-setting resin through an adhesive, whereby the filler member is surrounded by the resin sheet having the projection and the additional resin sheet while being vertically interposed therebetween.

In a preferred embodiment of the present invention, the additional resin sheet has at least one display section formed thereon in a manner to be different from the display section of the resin sheet having the projection.

In a preferred embodiment of the present invention, the forming the resin sheet with the projection includes heating the other portions of the resin sheet so as to be softened using a heating die and shaping the resin sheet to be provided with the projection using a forming mold.

In the present invention, the resin for the filler member is filled in the projection of the resin sheet printed or unfigured, to thereby be integrated with the resin sheet due to solidification thereof. Thus, the adhesive may be interposed between the resin sheet and the filler member in view of bonding strength therebetween depending on a material for each of the resin sheet and filler member, forming conditions and the like. The adhesive may be a hot-melt adhesive such as a vinyl chloride resin adhesive, a polyester resin adhesive or the like. Alternatively, it may be a thermosetting adhesive such as an urethane resin adhesive, an epoxy resin adhesive or the like.

Also, in the present invention, the resin sheet having the display section printed thereon or the printed resin sheet may be formed on one surface thereof with an ink receiving layer. The ink receiving layer may be provided with a graphic printing layer including a display section such as a light-permeable letter, pattern or symbol by means of microdots having a plurality of colors including at least cyan, magenta and yellow. The filler member may be arranged on a lower surface of the printed layer. When the display section is formed on the resin sheet by means of a printer, the key top member may be accommodated to a variety of design forming data, to thereby be suitable for not only full-color display at enhanced definition and accuracy but diversified small-quantity production. Also, arrangement of the filler member under the printed display section permits the display section to provide satisfactory brightness and chroma, to thereby exhibit increased visibility. Also, it permits the display section to be readily accommodated to special decoration commonly utilizing metallic decoration, hologram decoration, an actual photograph, computer graphics (CG) or the like, so that the key top member of the present invention may highly appeal to users.

Also, arrangement of the printed display section between the transparent resin sheet and the filler member prevents wear of the printed display section during operation of the key top, to thereby ensure that the display section exhibits enhanced durability and visibility over a long period of time.

Further, the method of the present invention permits a design created by a computer to be applied directly to the printed display section without a making-up step or the like. Also, the printing is carried out on the resin sheet, to thereby inexpensive as compared with printing on a molded article or the like. In addition, it facilitates formation of a layer colored white, silver or the like in an industrial scale. Thus, it permits diversified small-quantity production of the key top to at a low cost.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described with reference to the accompanying drawings.

Figure 1:
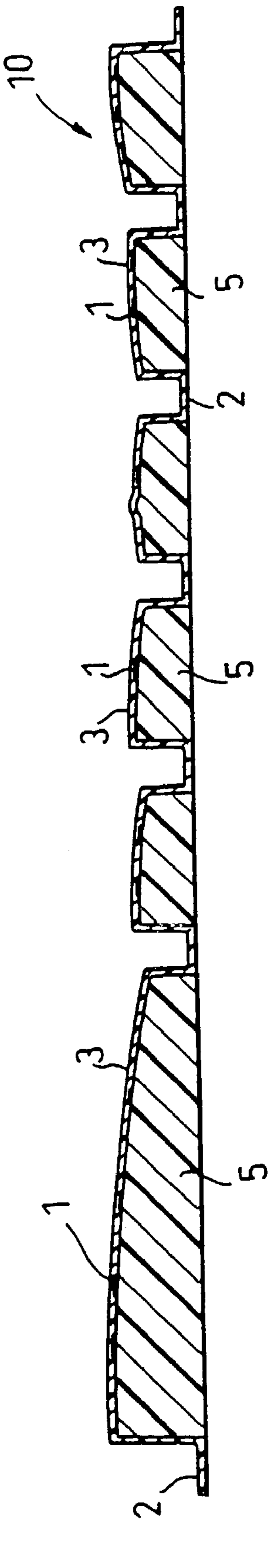
FIG. 1 is an enlarged vertical sectional view showing an embodiment of a key top member for a push button switch structure according to the present invention.

Referring first to FIG. 1, an embodiment of a key top member for a push button switch structure according to the present invention is illustrated. A key top member of the illustrated embodiment generally designated at reference numeral 10 includes a thermoplastic resin sheet 2 acting as an upper resin sheet and having display sections 1 such as a letter, a symbol, a pattern or design, or the like printed thereon, to thereby be a printed resin sheet. The printed resin sheet 2 is formed with hollow projections 3, each of which is shaped in conformity to an overall or outer configuration of each of key top elements constituting the key top. The key top member 10 of the illustrated embodiment also includes filler members 5 each made of photo-setting resin and securely arranged in a respective one of the projections 3 directly or through an adhesive (not shown), to thereby constitute each of the key top elements in cooperation with each of the projections 3.

In the illustrated embodiment, a plurality of the projections 3 are formed in series in a manner to be connected to each other. The key top member 10 of the illustrated embodiment may include only one such projection 3. Such a key top member may be incorporated in various electronic equipment in such a manner that one or more key top elements independent from each other or a plurality of key top elements partially connected to each other are combined with pressers, rubber cover members and the like as required.

Figure 2A:
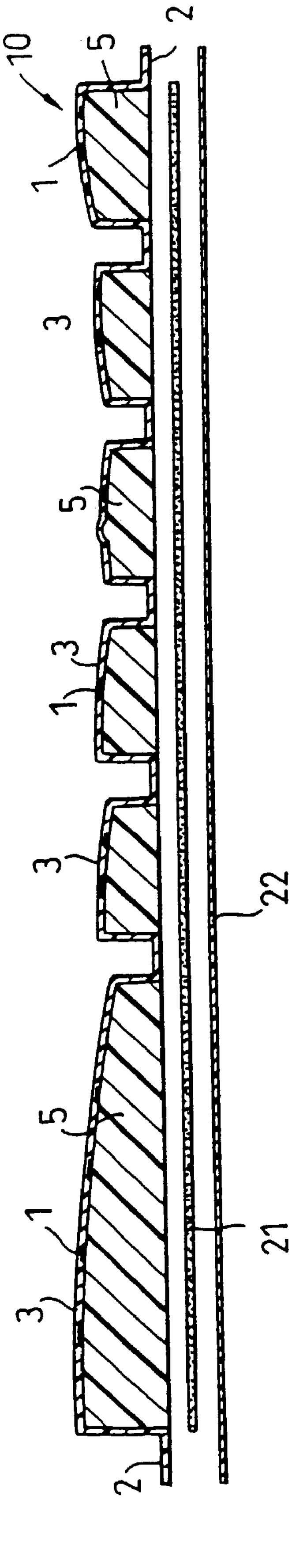
FIGS. 2A, 2B and 2C are enlarged vertical sectional views showing another embodiment of a key top member for a push button switch structure and modifications thereof according to the present invention.

Referring now to FIG. 2A, another or a second embodiment of a key top member for a push button switch structure according to the present invention is illustrated. A key top member 10 of the illustrated embodiment includes another or a second resin sheet 22 arranged through an adhesive 21 under a resin sheet 2 acting as an upper resin sheet and filler members 5 so as to act as a lower resin sheet, resulting in the filler members 5 being surrounded with the upper and lower resin sheets while being vertically interposed therebetween.

Figure 2B:
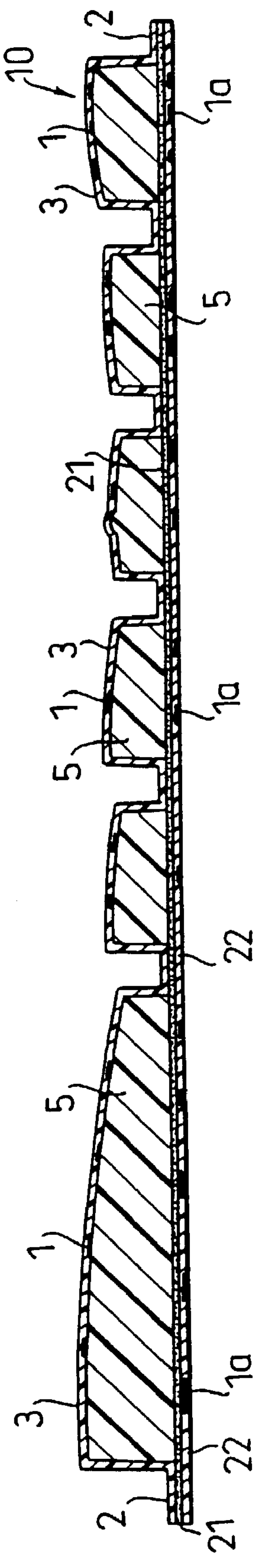
Figure 2C:
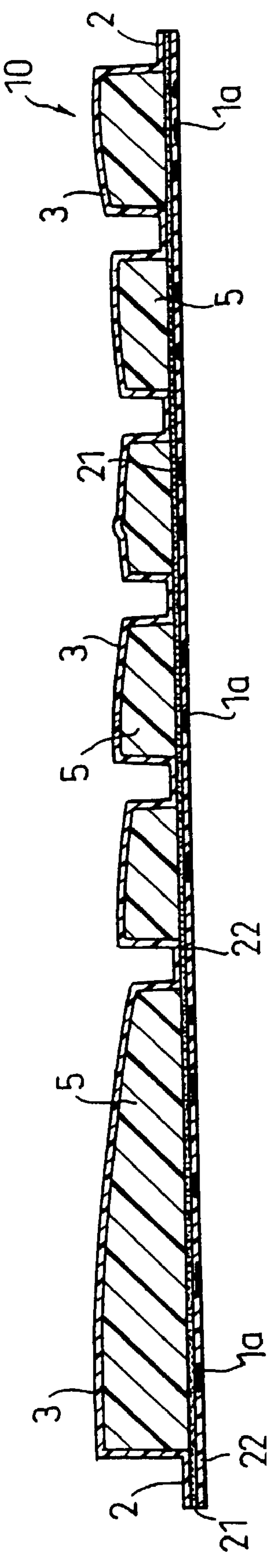

In the illustrated embodiment, the lower resin sheet 22 may be plain or unfigured as shown in FIG. 2A or have display sections 1*a* constructed in a manner to be different from the display sections 1 of the upper resin sheet 2 printed thereon, as shown in FIG. 2B. Alternatively, the upper resin sheet 2 may be plain and only the lower resin sheet 22 may have display sections 1*a* printed thereon, as shown in FIG. 2C. The remaining part of the illustrated embodiment or each modification thereof may be constructed in substantially the same manner as the first embodiment described above.

Figure 3:
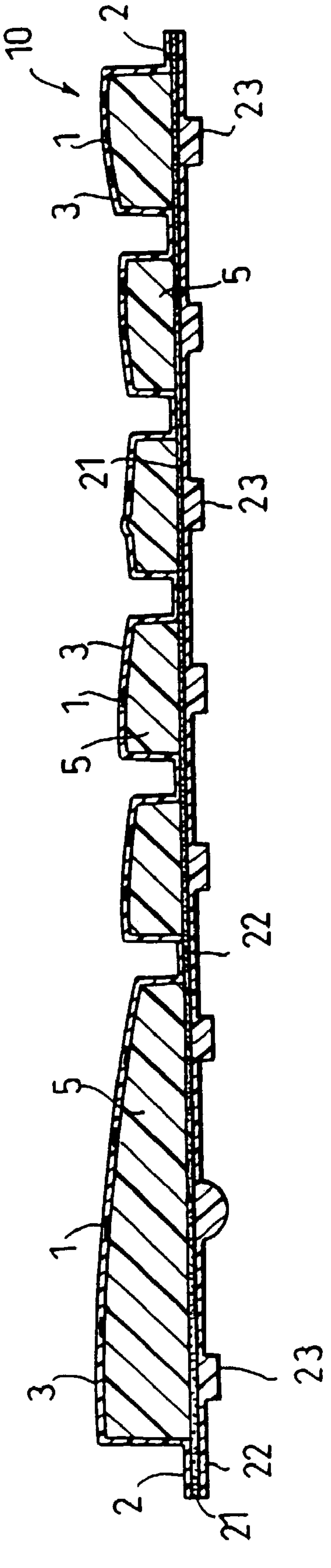
FIG. 3 is an enlarged vertical sectional view showing a further embodiment of a key top member for a push button switch structure according to the present invention.

Referring now to FIG. 3, a further or third embodiment of a key top member for a push button switch structure according to the present invention is illustrated. A key top member 10 of the illustrated embodiment includes a plurality of microprojections 23 provided on a lower surface of a lower resin sheet 22 so as to be downwardly projected therefrom. The microprojections 23 each function as a presser for pressing an electrical contact of a push button switch.

Alternatively, filler members 5 made of a photo-setting resin may each be provided with a protrusion in a manner to be integral with or separate from the filler member and then the lower resin sheet 22 is arranged so as to cover the protrusions, so that the protrusions may each act as a presser for an electrical contact. The remaining part of the illustrated embodiment may be constructed in substantially the same manner as the embodiments described above.

Now, manufacturing of the key top member of the present invention thus constructed will be described. A material for the upper resin sheet 2 having the display sections 1 printed thereon is not limited to any specific material so long as it is thermoplastic resin. However, in view of printing properties of the resin sheet 2 and moldability of the projections 3, the upper resin sheet 2 may be suitably made of a material selected from the group consisting of polyester resin, acrylic resin, styrene resin, olefin resin, polycarbonate resin, ABS resin, polypropylene resin, allyl resin, vinyl chloride resin, modified polymers thereof, alloy compounds thereof and the like.

More specifically, the materials include, for example, polyethylene terephthalate, polyethylene naphthalate, polycarbonate, polypropylene, polyacrylic ester, polystyrene, vinyl chloride and the like. A colorless transparent resin sheet, a colored transparent resin sheet or a semitransparent resin sheet which may be made of such a material as described above may be used as the upper resin sheet 2. The resin sheet 2 may be formed to have a thickness of about 10 to 500 μm. The resin sheet 2 has the display sections 1 each including a letter, a symbol, a pattern or the like printed on one or both surfaces thereof.

Printing techniques, a type of an ink and the like used for the printing are not substantially subjected to any restriction. For example, printing such as screen printing, offset printing, gravure printing, pad printing, thermal transfer printing, ink jet printing, sublimation printing or the like may be suitably used. Inks used for the above-described printing techniques may be used. In order to facilitate printing which forms more complicated decoration and exhibits enhanced design properties, an electronic printer such as a fusion type thermal transfer printer, a sublimation type thermal transfer printer, an ink jet type printer, a toner transfer printer or the like may be used. Thus, at least any one of a sublimation type heat transfer printer, a toner electronic type printer, an electrostatic image type printer, a laser exposure thermal development type printer, an ink jet type printer, a thermal transfer printer, a heat color-development type printer may be used for forming the display sections 1 including a light-permeable color, pattern or symbol by means of microdots having a plurality of colors such as a combination of cyan, magenta and yellow.

Also, a combination of the above-described printing with a deposited metal film, a thin film by sputtering, a transferred foil or the like may be applied to formation of a laminate, working for decoration such as laser working, or the like.

The display sections 1 may be formed on at least one of upper and lower surfaces of the upper resin sheet 2. However, the illustrated embodiment may be so constructed that the upper resin sheet 2 is made of a transparent material and the display sections 1 are arranged on a rear surface of the upper resin sheet 2 by printing. Such construction prevents the display sections 1 from being externally exposed, to thereby enhance resistance to wear thereof. Thus, the display sections 1 each including a letter or the like are printed on the rear surface of the transparent resin sheet 2, resulting in the display sections each constituting an inner or upper surface of each of the projections 3, so that wear of the printed display section 1 during operation of the key board may be effectively prevented. Also, the resin sheet 2 having a variety of designs and a silver foil (not shown) may be laminated on each other to provide metallic decoration or a punched or void character may be printed thereon to provide back-lighting of the character. Further, in order to enhance wear resistance of the resin sheet 2 and marring resistance thereof, the resin sheet may be subjected to a hard coat treatment using acrylic resin, silicone resin, melamine resin or the like.

The display sections 1 are each printed on a portion of the resin sheet 2 positionally corresponding to a top surface of each of the projections 3, as well as a side surface thereof as required.

Also, the upper resin sheet 2 may be formed by laminating a plurality of resin sheet members of the identical type or different type on each other. This is suitably selected depending on factors such as thermal characteristics of the resin sheet 2, workability thereof, printing characteristics thereof, design characteristics thereof and the like.

Further, in order to enhance printability of the upper resin sheet 2, it may be subjected on a printed surface thereof to a suitable surface treatment. For example, the upper resin sheet 2 is formed thereon with a printing ink receiving layer depending on printing techniques employed. For example, when sublimation type thermal transfer printing is employed, the upper resin sheet 2 may be formed thereon with a coating layer made of vinyl chloride resin, vinyl acetate resin or polyester resin. When ink jet printing is employed, the upper resin sheet 2 may be formed thereon with a water absorbing layer for fixing a water soluble ink therein. Also, in order to improve adhesion of the upper resin sheet 2, it may be subjected to a surface treatment such as a corona discharge treatment, a plasma treatment, an ultraviolet (UV) treatment, a primer treatment or the like as required.

Figure 4A:
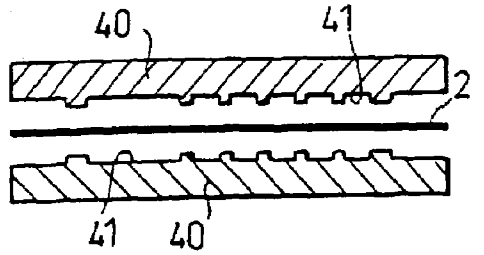
FIGS. 4A to 4F each are a schematic sectional view showing each of steps in manufacturing of an upper resin sheet incorporated in a key top member according to the present invention.
Figure 4B:
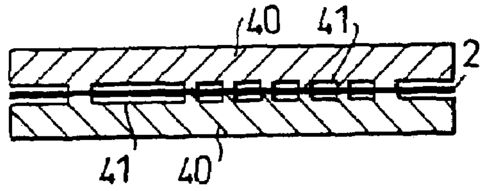

Then, the upper resin sheet 2 having the display sections 1 thus printed thereon is formed with the projections 3 each having a configuration conforming to an outer configuration of each of the key top elements constituting the key top. Such formation of the projections 3 may be carried out by pressure-vacuum forming. Now, such forming will be described with reference to FIGS. 4A to 4F, wherein FIGS. 4A and 4B each show a step of heating the upper resin sheet 2 made of thermoplastic resin and having a plurality of the display sections 1 printed thereon. First, as shown in FIG. 4A, the upper resin sheet 2 is arranged between dies 40 heated by a heater and then interposedly held therebetween, resulting in it being heated.

At this time, the dies 40 for heating is heated to a predetermined temperature which permits softening of the upper resin sheet 2. Thus, the heating temperature suitably depends on a material for the sheet 2. Typically, the heating temperature is within a range between about 100° C. and about 250° C. This permits the upper resin sheet 2 to be softened, which is then transferred to a pressure-vacuum forming step, wherein the resin sheet 2 is stretched, resulting in the projections 3 being formed. At this time, heating of the whole upper resin sheet 2 causes a top surface of each of the projections corresponding to each of the key top elements constituting the key top member to be stretched as well, leading to deformation of a letter, a figure or the like printed on the portion. Also, concurrent formation of the plurality of projections 3 causes misregistration of the display sections which are to be placed on the projections. Thus, partial heating which is adapted to heat a portion of the upper resin sheet 2 other than a portion thereof which is to constitute the top surface of each of the projections is employed.

To this end, the heating dies 40 are each formed at a portion thereof corresponding to the top surface of each of the projections 3 with a recess 41. The recess 41 functions as an air heat-insulating layer which prevents heat from being transmitted directly to a portion of the upper resin sheet 2 which is to constitute the top surface of each projection 3, resulting in the partial heating described above being attained.

In this instance, it should be considered to ensure that a temperature of the portion of the upper resin sheet 2 which is to constitute the top surface of each projection 3 is kept relatively low and the remaining portion thereof is heated to a level sufficient to be softened. Alternatively, the partial heating described above may be carried out by cooling of the dies rather than formation of the recesses 41 therein.

A temperature to which the upper resin sheet 2 is to be heated is determined depending on a material therefor. Typically, it is softened at a temperature within a range between about 100° C. and about 250° C. and preferably between about 120° C. and about 200° C. Also, the portion of the upper resin sheet 2 which is to constitute the top surface of each projection 3 is preferably set at a temperature lower by about 20° C. than the above-described temperature.

Figure 4C:
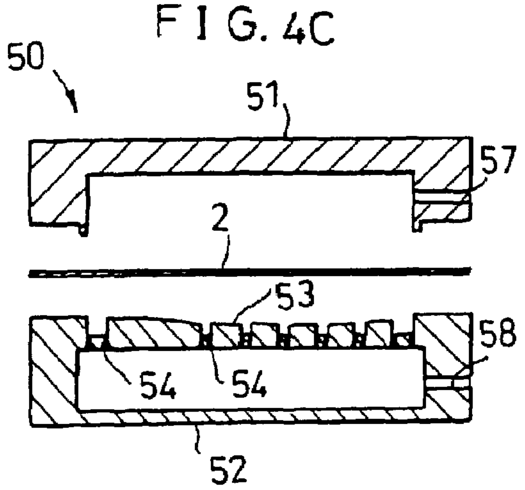
Figure 4D:
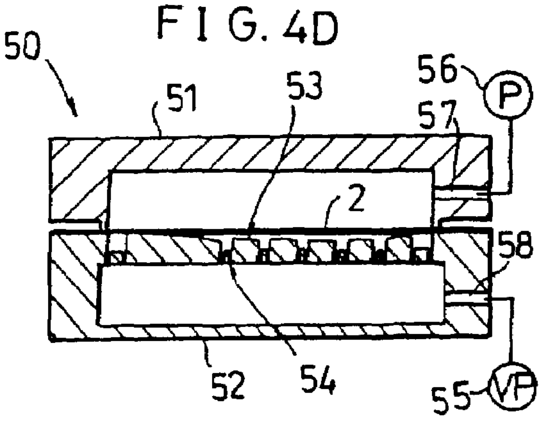

Pressure-vacuum forming of the upper resin sheet 2 thus partially heated is carried out by introducing it into a mold 50 for pressure-vacuum forming as shown in FIG. 4C. The mold 50 is constituted by an upper mold member 51 and a lower mold 52 which are vertically separable from each other and is kept at a predetermined temperature lower than that of the dies 40 so that the upper resin sheet 2 softened may be cooled for solidification. Then, the upper resin sheet 2 is interposed between the upper mold member 51 and the lower mold member 52 as shown in FIG. 4D. The upper mold member 51 is connected through an air hole 57 to an air pump 56, so that an air pressure may be applied to the upper resin sheet 2 in the upper mold member 51. The air pressure is adjusted in conformity to formability of the resin sheet. It is typically set to be about 1 to 20 kgf/cm$^2$. Also, the lower mold member 52 is provided with protrusions 53 for forming the upper resin sheet 2 with asperities by stretching. Also, the lower mold member 52 is formed with a plurality of fine through-holes 54 in a manner to be arranged around the protrusions 53, to thereby outwardly evacuate air under the upper resin sheet 2 therethrough. In order to promote the evacuation, the lower mold member 52 is connected through a vacuum evacuation hole 58 to a vacuum pump 55.

Figure 4E:
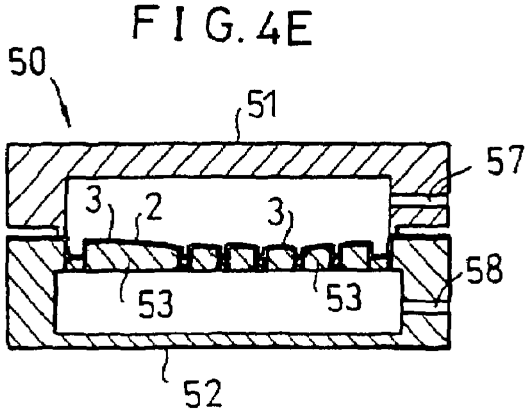

This permits the upper resin sheet 2 partially heated to be exposed to both an air pressure downwardly applied to an upper surface of the upper resin sheet 2 and suction force downwardly exerted on a lower surface thereof due to the evacuation, so that the upper resin sheet 2 may be deformed along the protrusions 53 of the lower mold member 52, resulting in the sheet 2 being formed with the projections 3, as shown in FIG. 4E.

In this instance, the portion of the upper resin sheet 2 which is to constitute the top surface of each of the protrusions 53 is kept at a relatively low temperature, to thereby prevent the upper resin sheet 2 from being much heated. Also, as shown in FIG. 4E, when the illustrated embodiment is so constructed that a position at which the upper resin sheet 2 is interposed between the upper mold member 51 and the lower mold member 52 is defined to be substantially identical with a level of the top surface of each of the protrusions 53, resulting in the remaining portion of the upper resin sheet 2 being downwardly drawn, the upper resin sheet 2 may be formed into a predetermined configuration while fully preventing stretching of the portion of the upper resin sheet 2 corresponding to the top surface of each of the projections 3.

At this time, when the upper resin sheet 2 is brought into contact with the lower mold member 52, it is cooled by the lower mold member 52, to thereby be solidified, so that the upper resin sheet 2 may be formed with the projections 3.

The upper resin sheet 2 thus provided with the projections 3 is formed on an outer periphery thereof with an unnecessary edging portion 6. Then, the upper resin sheet 2 is removed from the mold 50. The upper resin sheet 2 has the projections 3 connected to each other in series as shown in FIG. 4F.

Figure 4F:
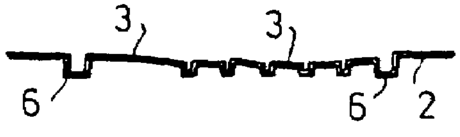

After the upper resin sheet 2 having the projections 3 connected to each other is removed from the mold 50, it is transferred to a treatment of eliminating unnecessary portions of the resin sheet 2 such as bottom and peripheral edge portions therefrom, to thereby leave the top and side surfaces of the projections 3, resulting in an outer shell for the key top member in which the filler members 5 are received being obtained, as shown in FIG. 4F. Alternatively, removal of the unnecessary portions may be carried out after arrangement of the filler members 5 in the projections 3.

It should be understood that formation of the projections 3 is carried out by selectively stretching a predetermined portion of the upper resin sheet 2 made of thermoplastic resin rather than stretching the whole resin sheet 2. For example, in the key top member of the present invention, the printed resin sheet has the display section 1 including a design such as a letter, a numeral, a symbol, a pattern or the like printed on the portion thereof corresponding to the top surface of each of the key top elements constituting the key top, therefore, formation of the projections 3 of the upper resin sheet 2 requires to fix the portion of the upper resin sheet 2 which is to constitute the top surface of each projection 3 or key top element to mainly stretch only the side and bottom of the projection 3, to thereby form the projection. For this purpose, pressure-vacuum forming which permits the portion of the upper resin sheet 2 corresponding to the top surface of each key top element or projection to be fixed and the remaining portion thereof to be stretched is suitable for formation of the projections 3 of the upper resin sheet 2.

More particularly, in FIG. 4D, the portion of the upper resin sheet 2 which is to constitute the top surface of each of the projections 3 is fixed by the mold concurrently with closing of the mold 50, to thereby be kept from being stretched although it is rounded as required. Then, as shown in FIG. 4E, a vacuum pressure and an air pressure are applied to an interior of the mold 50, so that the upper resin sheet 2 may be stretched by the pressures, to thereby be deformed along the mold. Then, the upper resin sheet 2 is cooled through the mold 50, resulting in the projections 3 for the key top elements being formed. At this time, the resin sheet is stretched at the portions thereof corresponding to the side and bottom of each key top element, so that the display section printed on the portion of the resin sheet corresponding to the top surface of each of the projections which is not substantially stretched is kept from being deformed and reduced in thickness, resulting in the display section having enhanced quality. A ratio at which the portions corresponding to the side and bottom of each key top element are stretched is varied depending on dimensions of the key top element. However, it is typically about 30 to 80% based on an initial thickness of the resin sheet.

Thus, the illustrated embodiment permits stretching and deformation of the portion of the resin sheet which is to constitute the top surface of each of the projections to be minimized and the remaining portion of the resin sheet to be stretched, to thereby substantially prevent deformation of each of the printed display sections 1 and a deterioration in aesthetic properties thereof, resulting in a reduction in thickness of the printed display section which causes a deterioration in light shielding properties thereof in the case of character back-lighting being prevented. Also, it prevents cracking of the display section even when it is constituted by a silver ink hard to stretch or a silver foil, to thereby ensure that the key top may exhibit satisfactory appearance and quality. It is of course that in order to smooth a boundary between a portion of the upper resin sheet 2 stretched and a portion thereof unstretched, force by which the portion of the resin sheet to constitute the top surface of the key top element or projection is fixed may be adjusted within a range which keeps the printed display section from being adversely affected, to thereby gradually stretch the resin sheet. Alternatively, stretching of the portion of the resin sheet corresponding to the top surface may be attained by heating the portion thereof to be stretched.

Thus, pressure-vacuum forming permits an apparatus therefor to be highly simplified in structure and reduced in cost, because it merely requires only a heater for heating the resin sheet and a simplified mold formed with protrusions. Also, it permits productivity to be increased to a level several times as high as injection molding.

However, techniques of forming the projections 3 are not limited to pressure-vacuum forming. The resin sheet made of thermoplastic resin and previously provided with a plurality of the display sections may be subjected to vacuum forming or pressure forming using the mold shown in FIG. 4, compression molding, or the like, so that the projections each having a shape conforming to an outer configuration of each of the key top elements constituting the key top may be suitably formed. For example, vacuum forming may be practiced in a manner to evacuate air through the vacuum or evacuation hole provided through the recess of the mold to form a vacuum atmosphere in the recess, to thereby deform the printed upper resin sheet 2 softened by heating. This results in the upper resin sheet 2 being brought into tight contact with the recess, to thereby form the projections. Also, pressure forming may be carried out by applying an air pressure to a front or upper surface of the printed upper resin sheet 2 to deform the resin sheet, leading to close contact of the resin sheet with the recess. At this time, the mold has been cooled, so that the printed upper resin sheet 2 softened is cooled concurrently with contact thereof with the recess, to thereby be solidified, so that the printed resin sheet may be formed with the projections. Further, compression molding may be carried out in a way of heating the printed upper resin sheet 2 to its softening point and then interposing it between two mold members respectively formed with a recess and a projection and cooled, to thereby form the resin sheet 2 with the projections by means of a pressure obtained by joining the mold members together. Thus, the compression molding is carried out using a pair of the recessed mold member and projected mold member, to thereby be reduced in manufacturing cost and exhibit enhanced productivity as compared with injection molding.

The photo-setting resin which may be used for formation of the filler members 5 in the illustrated embodiment is not limited to any specific material so long as it is in the form of liquid before solidification and solidified by exposure to ultraviolet rays, visible rays or the like. Thus, the photo-setting resins include, for example, acrylic photo-setting resin, methacrylic photo-setting resin, unsaturated polyester photo-setting resin, styrene photo-setting resin, urethane photo-setting resin, diallyl phthalate photo-setting resin, a combination thereof and the like. The photo-setting resin may have an additive such as a curing agent, a catalyst, a viscosity modifier, a reaction rate adjusting agent, a coloring agent, a filler, an extender or the like added thereto.

The photo-setting or ultraviolet-cured resin is poured into a mold of a predetermined configuration and exposed to ultraviolet rays, to thereby be cured. Then, the cured resin is removed from the mold and then may be applied to an inner surface of the projections 3 of the printed resin sheet 2 by means of an adhesive.

Figure 5A:
FIGS. 5A to 5C each are a schematic view showing each of steps in manufacturing of a key top member for a push button switch structure according to the present invention.
Figure 5B:
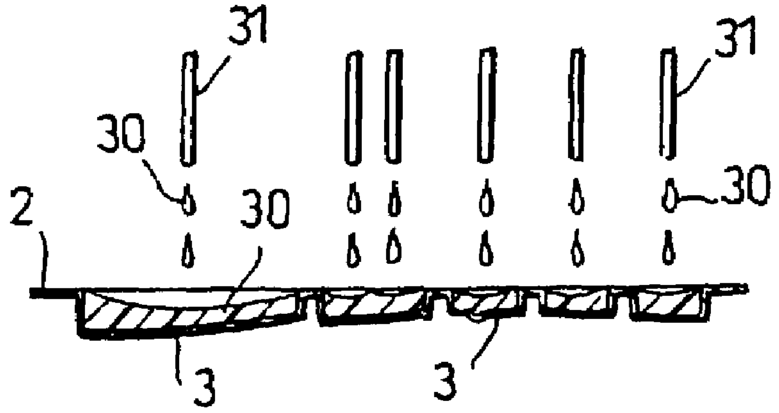
Figure 5C:
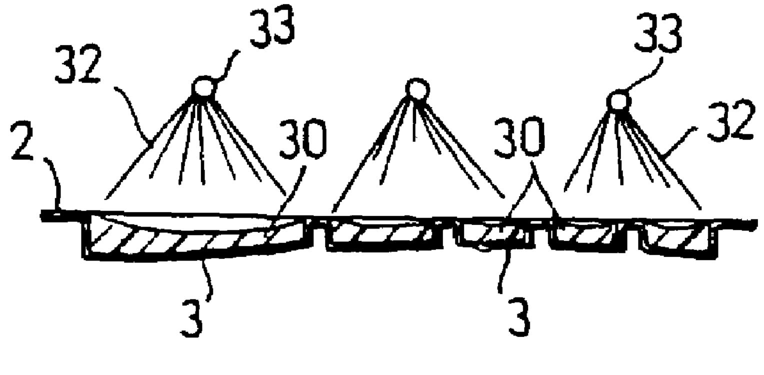

Now, application of the cured resin to the resin sheet 2 will be described with reference to FIGS. 5A to 5C. The upper resin sheet 2 having the projections 3 each formed in conformity to an outer configuration of each of the key top elements by pressure-vacuum forming is subjected to trimming of the unnecessary outer edging portion and turned over to face the projections 3 down as shown in FIG. 5A. Then, photo-setting resin 30 in the form of liquid is poured into the projections 3 by means of a dispenser 31 or the like, to thereby be filled therein as shown in FIG. 5B. Subsequently, as shown in FIG. 5C, the photo-setting resin is exposed to light beams 32 such as ultraviolet rays or the like emitted from light sources or lamps 33, to thereby be cured, resulting in the key top member of the illustrated embodiment being provided.

In general, photo-setting resin is highly shrunk during curing thereof. Thus, as required, after injection and curing of the photo-setting resin are completed once, the photo-setting resin is poured in an amount required to compensate for the shrinkage again and then exposed to light, resulting in it being cured.

Also, photo-setting resin not only requires ultraviolet rays increased in intensity for curing thereof but generates heat by itself due to the curing. Thus, a cooling mechanism (not shown) may be arranged so as to prevent an excessive increase in temperature of the printed resin sheet during the curing.

The key top member of the illustrated embodiment thus manufactured is covered on an upper portion thereof with the resin sheet on which a variety of designs are printed, to thereby exhibit improved design properties. Also, the designs are applied to the inner surface of the transparent resin sheet, resulting in resistance to wear of the designs and resistance to marring thereof being enhanced. Further, it may be rapidly manufactured using a vacuum or pressure-vacuum forming mold inherently reduced in cost and without requiring any expensive mold. Moreover, the key top member is substantially free from deformation of the top surface of each of the key top elements, deformation of the designs printed and misregistration thereof, to thereby exhibit enhanced quality.

Further, in the key top member of the illustrated embodiment, the upper resin sheet 2 is arranged so as to cover both top and side surfaces of each of the key top elements. Thus, the key top member permits any desired design such as decoration or the like to be applied to not only the top surface of the key top element but a portion of key top element hard to print such as a side surface thereof, a boundary between the top surface and the side surface or the like with ease. Moreover, the illustrated embodiment permits key top elements conventionally manufactured by injection molding to be formed by merely pouring the photo-setting resin in the form of liquid into the projections and curing it, to thereby eliminate a necessity of handling resin at a high temperature under an increased pressure and therefore a necessity of using a large-scale equipment and an expensive mold, leading to mass-production of the key top member at a low cost.

In addition, the key top member of the illustrated embodiment which has a plurality of the key top elements formed on the single resin sheet may be put to various uses without any further treatment. Alternatively, it may be further subjected to any desired treatment such as removal of an unnecessary portion from the upper resin sheet by partial punching, separation of the key top elements from each other or the like. Typically, the key top member of the illustrated embodiment may be incorporated in the form of a key board in a mobile phone, a measuring instrument, a remote control or the like in such a manner that a rubber sheet member provided thereon with protrusions for pressing electrical contacts is arranged under the key top and then a sheet-like film contact member or an electrical substrate is arranged under the rubber sheet member.

In the key top member 10 of the second embodiment shown in FIG. 2A, 2B or 2C, as described above, the second or lower resin sheet 22 is securely arranged under the upper resin sheet 2 provided with the projections 3 and the filler members 5 arranged in the projections 3 through the adhesive 21 so as to surround the filler members 5 in cooperation with the upper resin sheet 2 while vertically interposing the filler members 5 therebetween. The filler members 5 are each formed by filling a photo-setting resin in each of the projections 3. Such arrangement of the lower resin sheet 22 permits reliability of the key top member of the illustrated embodiment, dimensional stability thereof, strength thereof, rigidity thereof and the like to be enhanced and prevents detachment of the filler members 5 therefrom. Also, it prevents intrusion of any foreign matter such as dust, water vapor or the like into an interface between the filler members 5 and the upper resin sheet 2, to thereby further enhance reliability of the key top.

Also, in the illustrated embodiment, the lower resin sheet 22 may be made of a material colored, printed or subjected to metallic finish and the upper resin sheet 2 may be formed to be semi-transparent. Such construction permits light entering each of key top elements to be reflected by the lower resin sheet 22, so that the key top member of the illustrated embodiment may have a colored or lustrous design. For example, the upper resin sheet 2 may have a design such as a letter, a numeral or the like printed thereon using a semi-transparent blue ink and the lower resin sheet 22 is colored red. Such construction permits the key top to exhibit a unique design wherein each of the key top elements entirely exhibits a red color and a blue letter, a blue numeral or the like is viewed or observed through the top surface of the key top element as if it is floated in the key top element.

The lower resin sheet 22 may be made of thermoplastic resin. In view of handling of the lower resin sheet 22, printability thereof and the like, it is preferably made of polyester resin, acrylic resin, styrene resin, olefin resin, polycarbonate resin, ABS resin, polypropylene resin, polyacrylate resin or the like.

More specifically, the thermoplastic resins include, for example, polyethylene terephthalate, polyethylene naphthalate, polycarbonate, polypropylene, polyacrylate, polystyrene, polyvinyl chloride and the like. The thermoplastic resin is preferably transparent and colorless, transparent and colored, or semi-transparent. The resin sheet is formed to have a thickness of between about 15 μm and about 500 μm and has display sections 1 including a letter, a symbol, a pattern or the like printed on at least one surface thereof.

In this instance, the lower resin sheet 22 securely arranged under the upper resin surface 2 may be formed thereon with display sections different from the display sections 1 printed on the upper resin sheet 2 by printing.

Printing techniques, a type of an ink and the like used for the printing are not substantially subjected to any restriction. For example, printing such as screen printing, offset printing, gravure printing, pad printing, thermal transfer printing, ink jet printing, sublimation printing or the like may be used. Inks for the above-described printing techniques may be suitably used. Also, a combination of the above-described printing with a deposited metal film, a thin film by sputtering, a transferred foil, or the like may be applied to formation of a laminate, working for decoration such as laser working, or the like. Further, the upper resin sheet 2 may be formed by laminating a plurality of resin sheets identical with each other or different from each other on each other.

This is suitably selected depending on thermal characteristics of the resin sheet, workability thereof, printing characteristics thereof, design characteristics thereof and the like.

The illustrated embodiment, as described above, is so constructed that the filler members 5 are surrounded by the upper resin sheet 2 and the lower resin sheet 22 while being interposed therebetween. In this instance, when the upper resin sheet 2 has the display sections 1 printed thereon, the lower resin sheet 22 may be configured in the form of either a plain or unfigured resin sheet such as a transparent sheet, a colored sheet or an unpatterned sheet or a printed resin sheet having display sections printed thereon.

Also, when the upper resin sheet 2 provided with the projections 3 is in the form of a plain resin sheet, the lower resin sheet 22 may have display sections 1*a* printed thereon. Both resin sheets are joined together to constitute the key top member of the illustrated embodiment.

In any event, the key top member of the illustrated embodiment may be so constructed that the display section such as a letter, a symbol, a pattern or the like may be observed or viewed through each of the transparent key top elements.

The adhesive 21 arranged between the upper resin sheet 2 and filler members 5 in the projections 3 and the lower resin sheet 22 is selected in view of adhesion between each of the upper and lower resin sheets 2 and 22 and the photo-setting resin for the filler members 5, workability of the adhesive and the like. In particular, when the lower resin sheet 22 has the display sections 1*a* printed thereon, the adhesive 21 is required to be transparent. Thus, the adhesive 21 is preferably selected from the group consisting of, for example, an acrylic adhesive, a polyester adhesive, a silicone adhesive, an urethane adhesive and the like. Also, the adhesives include a solvent evaporation type adhesive, a two-part setting type adhesive, a photo-setting type adhesive and the like. A photo-setting type adhesive may be preferably used for this purpose because it ensures positive adhesion between the upper resin sheet 2 and filler members 5 and the lower resin sheet 22 in a short period of time.

Adhesion between the lower resin sheet 22 and the photo-setting resin or filler members 5 by means of the adhesive 21 is not limited to any specific manner. For example, it may be carried out by applying an ultraviolet cured adhesive at a low viscosity to the filler members 5 by means of a dispenser and bringing the lower resin sheet 22 into close contact with the filler members 5. Then, the adhesive is immediately exposed to ultraviolet rays, to thereby be solidified, so that secure adhesion between the lower resin sheet 22 and the photo-setting resin for the filler members 5 may be ensured.

The key top member of the illustrated embodiment thus manufactured is so constructed that the upper resin sheet 2 is provided with the projections 3 for the key top elements of the key top member 10, in which the photo-setting resin for the filler members 5 is filled, and the lower resin sheet 22 is arranged under the filler members 5 while being securely attached thereto by means of the adhesive.

The upper resin sheet 2 has the various display sections 1 such as a letter, a symbol, a decoration and the like applied thereto. Such construction permits a design formed on the key top element to be complicated as compared with direct application of such a display section to the key top element. Also, it permits any desired design to be readily printed on a side surface of the projection 3 or key top element as well.

Also, formation of the display sections on a rear or lower surface of the upper resin sheet 2 by printing prevents external exposure of the display sections from a front or upper surface thereof, to thereby safely protect the display sections, as well as the photo-setting resin or filler members 5.

Further, the photo-setting resin or filler members 5 are covered with the lower resin sheet 22, so that the key top elements may be increased in strength and rigidity. Also, it prevents intrusion of moisture, water vapor, corrosive gas or the like into an interface between the upper resin sheet 2 and the photo-setting resin or filler members 5, to thereby ensure that the key top of the illustrated embodiment may exhibit enhanced reliability over a long period of time.

In addition, the illustrated embodiment may be configured so that the light-permeable resin is compounded so as to be substantially transparent and the lower resin sheet 22 has decoration or the like applied thereto. Such configuration permits the key top to exhibit a variety of design or decoration properties because the key top elements each have the display section printed on top, side and bottom surfaces thereof. For example, the upper and lower resins 2 and 22 may each have both concentration and hue suitably selected so that designs such as a letter and the like on the upper resin sheet 2 may be observed utilizing reflected light in the daytime and those on the lower resin sheet 22 may be emphasized utilizing upwardly transmitted light in the night. Also, when a metal foil or hologram sheet which reflects light at high brightness is laminated on the lower resin sheet 22, the display sections printed on the upper resin sheet may exhibit enhanced perspective.

Furthermore, the photo-setting resin may be colored or have a fine light-reflective filler, a scale-like filler, a pearl-like filler or the like compounded therein. This permits the key top of the illustrated embodiment to be readily provided with decoration in various ways.

Thus, the key top member of the illustrated embodiment permits the top surface of each of the key top elements, the side surface thereof, the rear surface thereof, as well as the filler member arranged therein to be readily decorated. This results in the key top being provided with a variety of designs and exhibiting reliability over a long period of time.

In the key top member of the embodiment shown in FIG. 3, the microprojections 23 are arranged so as to be positioned below the filler members 5 and downwardly projected. The microprojections 23 are each provided so as to act as a presser for pressing each of electrical contacts of a push button switch structure. In the illustrated embodiment, as described above, the microprojections 23 are arranged on the lower surface of the lower resin sheet 22 fixedly arranged on the lower surface of each of the filler members 5 by means of the adhesive 21 in a manner to downwardly extend therefrom. The microprojections 23 may be formed by drawing using a mold. The microprojections 23 may each be filled therein with the adhesive 21 as required. Alternatively, they may each be formed by adhering a member formed separately from the lower resin sheet 22 to the sheet 22.

The microprojections 23 are each formed to have a diameter of about 0.3 to 3.0 mm. A height thereof is determined depending on electronic equipment in which the key top member is to be incorporated, a height of a keyboard or the like. Typically, it may be formed to have a height of about 0.5 to 5.0 mm.

In the illustrated embodiment, the microprojections 23 may each be formed by subjecting the lower resin sheet 22 made of thermoplastic resin to heating under pressure. Techniques of heating the lower resin sheet 22 under pressure may include, for example, compression of the sheet 22 in a mold, utilization of an air pressure or a vacuum pressure, or the like by way of example. Suitable techniques may be selected depending on a configuration of the microprojections 23. For example, the microprojections 23 may be formed by heating the lower resin sheet 22 to a temperature near a softening point of the sheet and then inserting it into a vacuum mold formed with protrusions to bring the resin sheet into close contact with the mold by vacuum force.

The lower resin sheet 22 thus formed with the microprojections 23 is adhered to the lower surface of the filler members 5 by means of the adhesive 21 according to substantially the same procedure as described above. In this instance, it is preferable that the adhesive 21 be fully filled in each of the microprojections 23 of the lower resin sheet 22. Filling of the adhesive 21 in the microprojections 23 prevents deformation of the microprojections 23 when they are forcedly pressed against the electrical contacts.

The above-described construction of the illustrated embodiment permits the key top member to be arranged directly on a contact sheet without requiring a rubber sheet member, so that a push button switch structure in which the key top member is to be incorporated may be reduced in the number of parts.

As described above, the key top member 10 of the present invention may be incorporated in a mobile phone, a keyboard unit for electronic equipment or the like without any further treatment. Alternatively, a plurality of the key top members may be fixed as an assembly at a predetermined position on a rubber cover member. Arrangement of the plurality of key top members on the rubber cover member permits a single keyboard sheet to be constituted as a whole, to thereby facilitate incorporation of a plurality of the key tops into a keyboard unit for electronic equipment. Also, a variation in configuration of the rubber cover member, thickness thereof or the like permits a variation in height between the key tops. Further, in the case of the keyboard sheet, flexibility of the rubber cover member permits the keyboard sheet to be incorporated in an outer curved casing of electronic equipment.

The rubber cover member which may be used for this purpose may be made of any one of various thermoplastic elastomers such as a silicone rubber, an urethane rubber, and EPDM rubber and the like. It may be formed by compression molding, injection molding, transfer molding or the like. Fixing of the key top member on the rubber cover member may be carried out by fitting between the key top member and the cover member, use of an adhesive or a pressure sensitive adhesive, or the like. It is preferably carried out using an adhesive, because it permits adhesion therebetween to be firm to a degree sufficient to prevent detachment and peeling of the key top member from the cover member.

As can be seen from the foregoing, the key top member of the present invention is so constructed that the resin sheet having at least one display section printed thereon is provided with at least one projection having a configuration conforming to an outer configuration of the key top element and at least one filler member made of photo-setting resin is securely arranged in the projection directly or through the adhesive, to thereby constitute the key top element. Such construction prevents deformation of the display section due to stretching of the resin sheet, so that the key top may exhibit enhanced visibility. Also, it permits design data obtained by a computer to be applied to the display section of the key top element, resulting in a degree of freedom of the design being increased, so that the key top may be provided with a variety of design properties. Further, it leads to not only a reduction in manufacturing cost of the key top because use of an injection mold which is inherently expensive is not required, but an increase in quality of the key top manufactured. In addition, the key top member of the present invention is constituted by the printed resin sheet formed with the projections, so that diversified small-quantity production thereof may be attained without an increase in manufacturing cost. Moreover, the present invention permits mass production of the key top at a low cost as compared with the prior art wherein printing is applied to a molded or formed product, leading to a substantial improvement in productivity.

Further, the present invention may be constructed in such a manner that the filler member is surrounded by the upper and lower resin sheets while being vertically interposed therebetween. This permits the display section to exhibit an unique appearance such as a stereoscopic feeling and an enhanced gradation effect due to superposition of both resin sheets. Also, the present invention effectively prevents formation of ruggedness on the lower resin sheet due to shrinkage of the photo-setting resin for the filler member of the key top element during curing thereof, to thereby eliminate a deterioration in appearance of the key top and workability during manufacturing thereof and enhance adhesion between the filler member and the resin sheet, water-proofness of the key top and dust-proofness thereof. Further, the present invention ensures curing of the adhesive for lamination between the shaped sheet and the lower resin sheet, to thereby eliminate problems such as generation of odor from the adhesive and sticking thereof due to projection of the adhesive from therebetween, resulting in a commercial value of the key top being enhanced. Moreover, the key top member of the present invention exhibits enhanced safety and durability in operation thereof.

The invention will be understood more readily with reference to the following examples; however, these examples are intended to illustrate the invention and are not to be construed to limit the scope of the invention.

EXAMPLE 1

A resin sheet made of an acrylic resin sheet manufactured under a tradename "ACRYPRENE" by Mitsubishi Rayon Co., Ltd and formed to have a thickness of 0.2 mm was provided. The resin sheet had a plurality of lines of 0.2 mm in width screen-printed on one surface thereof in a manner to extend in both longitudinal and lateral directions and be spaced from each other at intervals of 1.0 mm. A polyester sheet of 0.2 mm in thickness manufactured under a tradename "PETMAX" by TOYOBO CO., LTD. was laminated on the resin sheet by means of a dry laminating adhesive manufactured under a tradename "HIGHBON 7662" by Hitachi Kasei Polymer Co., Ltd. in a manner to keep a printed surface of the resin sheet facing the polyester sheet. The lamination was carried out for 10 seconds at a temperature of 100° C. under a pressure of 2 $kgf/cm^2$. This resulted in a printed resin sheet (upper resin sheet) which has display sections printed thereon being provided.

Then, the upper resin sheet was provided with a plurality of push button portions each formed to have a predetermined configuration. This was carried out using a heating die (FIG. 4A) formed to have a shape corresponding to a plane of projection of a key top member for a push button switch structure and subjected to engraving by a depth of 5 mm at the same area, as well as a cooling pressure-vacuum forming mold (FIG. 4C) for forming the key top with projections.

Arrangement of the upper resin sheet in each of the die and mold took place so that the acrylic sheet was positioned in an upper member of each of the die and mold and the polyester sheet was positioned in a lower member thereof. A temperature of the heating die was controlled to be 190° C. and that of the cooling pressure-vacuum forming mold was adjusted at 30° C. The upper resin sheet was heated for 1 second in the heating die. Then, the heated upper resin sheet was inserted into the pressure-vacuum forming mold, to thereby be subjected to pressure-vacuum forming by concurrently applying both an air pressure of 5 kgf/$cm^2$ obtained through an air hole of the upper mold member and a vacuum pressure of 80 Torr obtained through a vacuum evacuation hole to the upper resin sheet. Then, after the upper sheet member was cooled for 3 seconds, the pressure-vacuum forming mold was opened, resulting in a sheet formed with projections (shaped sheet) being obtained.

Then, the shaped sheet was arranged on a jig or fixture so as to keep the projections of the sheet facing down and then ultraviolet-cured resin manufactured under a tradename "UV 130L" by Nogawa Chemical Co., Ltd. was poured into the projections of 3 mm in height by means of an air dispenser and exposed to ultraviolet rays for 15 seconds at a distance of 15 cm by means of a high-pressure mercury lamp of 120 W/m, to thereby be cured. The resin thus cured was recessed by about 0.5 mm due to shrinkage during the curing, therefore, the ultraviolet-cured resin described above was further filled in the recess of the cured resin using the air dispenser and exposed to ultraviolet rays for 5 seconds at a distance of 15 cm using the high-pressure mercury lamp of 120 W/m, resulting in a key top member for a push button switch structure being manufactured.

In the key top member thus obtained, the key top element was formed on the top surface thereof with a lattice constituted by lines which are spaced from each other at intervals of 1 mm and have a width of 0.2 mm. A maximum distance between points of the lattice was 1.02 mm. The whole top surface had distortion as small as 2%. Thus, it was found that the key top member manufactured had enhanced quality.

EXAMPLE 2

A polyallylate sheet manufactured under a tradename "U-POLYMER" by UNITIKA Ltd. and formed to have a thickness of 0.2 mm was used as a resin sheet. The resin sheet was formed thereon with a white letter, symbol or pattern using an ink of a concentration corresponding to 50% in light transmittance by screen printing for every push button of a push button switch structure. Also, the letter, symbol and pattern were each continuously trimmed at a periphery thereof with a light-shielding ink of a black color by screen printing. Then, a copolyester sheet of 0.2 mm in thickness manufactured under a tradename "Eastar PETG 6763" by EASTMAN CHEMICAL JAPAN LTD. was laminated on the resin sheet by means of a dry laminating adhesive manufactured under a tradename "HIGHBON 790-1" by Hitachi Kasei Polymer Co., Ltd. in a manner to keep a printed surface of the resin sheet facing the copolyester sheet. The lamination was carried out for 10 seconds at a temperature of 100° C. under a pressure of 5 kgf/$cm^2$. This resulted in a printed resin sheet (upper resin sheet) which has display sections printed thereon being provided.

A shaped sheet was formed of the upper resin sheet as in Example 1. Then, the shaped sheet was arranged on a fixture so as to keep projections facing down and then ultraviolet-cured resin manufactured under a tradename "UV 130L" by Nogawa Chemical Co., Ltd. was poured into the projections of 3 mm in height by means of an air dispenser and exposed to ultraviolet rays for 15 seconds at a distance of 15 cm by means of a high-pressure mercury lamp of 120 W/m, to thereby be cured, leading to formation of a semi-finished key top member.

Then, an ultraviolet-cured adhesive manufactured under a tradename "UV 250H" by Nogawa Chemical Co., Ltd. was applied to the semi-finished key top member by means of an air dispenser. Then, a transparent polyester sheet manufactured under a tradename "NOVACLEAR" by MITSUBISHI CHEMICAL CORPORATION and having an area sufficient to cover the whole key top member and a thickness of 0.2 mm was laminated on the key top member. Then, the key top was exposed through the transparent polyester sheet to ultraviolet rays for 5 seconds at a distance of 15 cm using a high-pressure mercury lamp of 120 W/m, to thereby cure the adhesive, resulting in the semi-finished key top member having an unnecessary resin sheet portion attached to a periphery thereof. Then, the unnecessary resin sheet portion was removed from the semi-finished key top member by punching using a punching jig, to thereby provide a key top member for a push button switch structure.

The resultant key top member was the character back-lighting type which permits the letter or pattern to be observed by reflected light and permits the letter or the like to be bright, to thereby be observed even in the dark due to irradiation of light thereon through a rear surface thereof. Also, the key top member fully prevented leakage of light therethrough when it is incorporated in a casing, because a black light-shielding ink was applied to a side surface of each of the key top elements and a region between the key top elements. Further, arrangement of the transparent polyester sheet having a size sufficient to cover the whole key top member and a thickness of 0.2 mm fully prevented intrusion of any foreign matter such as dust or the like into an interface between the photo-setting resin and the printed sheet and intrusion of water vapor thereinto under high-temperature and high-pressure conditions (temperature: 60° C., relative humidity: 95%, 240 hours), resulting in the key top member exhibiting enhanced reliability.

EXAMPLE 3

A polyallylate sheet manufactured under a tradename "U-POLYMER" by UNITIKA Ltd. and formed to have a thickness of 0.2 mm was used as a resin sheet (lower resin sheet). The lower resin sheet was colored red on one surface thereof by screen printing.

A resin sheet made of an acrylic resin sheet manufactured under a tradename "ACRYPRENE" by Mitsubishi Rayon Co., Ltd and formed to have a thickness of 0.2 mm was provided. The resin sheet was formed on one surface thereof with a blue letter, symbol or pattern using an ink of a concentration corresponding to 50% in light transmittance by thermal transfer printing for every push button of a push button switch structure by means of a thermal transfer printer manufactured under a tradename "ColorPrint 1635 PSJ by Seiko Instruments, Inc., resulting in a printed sheet being obtained.

Then, a polyester sheet of 0.2 mm in thickness manufactured under a tradename "Eastar PETG 6763" by EASTMAN CHEMICAL JAPAN LTD. was laminated on the printed sheet by means of a dry laminating adhesive manufactured under a tradename "HIGHBON 790-1" by Hitachi Kasei Polymer Co., Ltd. in a manner to keep a printed surface of the printed sheet facing the polyester sheet. The lamination was carried out for 10 seconds at a temperature of 100° C. under a pressure of 2 kgf/$cm^2$. This resulted in a printed resin sheet which has display sections formed thereon (upper resin sheet) being provided.

The upper resin sheet was subjected to pressure-vacuum forming as in Example 2, to thereby form key top elements and then an ultraviolet-cured adhesive manufactured under a tradename “UV 250H” by Nogawa Chemical Co., Ltd. was applied to the upper resin sheet by means of an air dispenser. Then, the key top elements, upper resin sheet and lower resin sheet were laminated on each other to form a laminate, which was exposed through a top surface of each of the key top elements to ultraviolet rays for 5 seconds at a distance of 15 cm using a high-pressure mercury lamp of 120 W/m, to thereby cure the adhesive, resulting in a key top member being obtained.

Then, the key top member was divided into the individual key top elements separate from each other by cutting. Subsequently, the key top elements were each adhered to a light-permeable silicone rubber sheet manufactured under a tradename “KE-581-U” by Shin-Etsu Chemical Co., Ltd. and formed with a protrusion for pressing each of electrical contacts of a push button switch structure by means of an adhesive manufactured under a tradename “11-584” by Hitachi Kasei Polymer Co., Ltd., resulting in a key top member for a push button switch structure being obtained.

The thus-obtained key top exhibited a unique design wherein the blue letter, symbol or pattern comes to a top surface of the key top element having a bottom colored red.

Also, adhesion of each key top element to the rubber sheet permitted the key top to be readily accommodated to a substantial difference in height between an electric substrate and the key top element by suitably setting a height of the rubber sheet for every key top element.

EXAMPLE 4

A transparent acrylonitrile sheet manufactured under a tradename “GECHRON” by Mitsui Chemicals, Inc. was subjected to pressure-vacuum forming as in Example 1, to thereby prepare a resin sheet (lower resin sheet) having pressers each constituted by projections of 1.0 mm in diameter and 0.5 mm in height and functioning to press an electrical contact.

Then, a transparent acrylonitrile sheet manufactured under a tradename “GECHRON” by Mitsui Chemicals, Inc. and formed to have a thickness of 0.2 mm was formed on one surface thereof with a white letter, symbol or pattern using an ink of a concentration corresponding to 50% in light transmittance by screen printing for every push button of a push button switch structure. Then, the letter, symbol and pattern were each continuously trimmed at a periphery thereof with a light-shielding ink of a black color by screen printing, resulting in a resin sheet being obtained. Then, a transparent acrylonitrile sheet manufactured under a tradename “GECHRON” by Mitsui Chemicals, Inc. and formed to have a thickness of 0.2 mm was laminated on the resin sheet by means of a dry laminating adhesive manufactured under a tradename “HIGHBON 790-1” by Hitachi Kasei Polymer Co., Ltd. in a manner to keep a printed surface of the resin sheet facing the latter sheet. The lamination was carried out for 10 seconds at a temperature of 100° C. under a pressure of 5 kgf/cm$^2$. This resulted in a printed resin sheet (upper resin sheet) which has display sections printed thereon being provided.

Then, the upper resin sheet was subjected to pressure-vacuum forming as in Example 1, to thereby form key top elements and then an ultraviolet-cured adhesive manufactured under a tradename “UV 250H” by Nogawa Chemical Co., Ltd. was applied to the key top elements by means of an air dispenser. Then, the key top elements and lower resin sheet were laminated on each other to form a laminate, which was exposed through the pressers to ultraviolet rays for 5 seconds at a distance of 15 cm using a high-pressure mercury lamp of 120 W/m, to thereby cure the adhesive, resulting in a key top member for a push button switch structure being obtained.

The resultant key top member had a variety of designs formed on top surfaces of the key top elements and was previously provided with the projection-like pressers for pressing electrical contacts, to thereby be reduced in thickness as compared with the key top in which the key top elements are adhered to the rubber sheet. Thus, it was found that the key top member is advantageously incorporated in a housing of a mobile phone or the like.

EXAMPLE 5

A commercially available polyester sheet manufactured under a tradename “CLEAR RECEIVER” by VICTOR COMPANY OF JAPAN, LIMITED and formed to have a thickness of 0.125 mm was provided. The polyester sheet was formed on one surface thereof or an ink receiving layer side thereof with a blue letter, symbol or pattern by thermal transfer printing for every push button of a push button switch structure by means of a thermal transfer printer manufactured under a tradename “Trueprint 3500PS” by VICTOR COMPANY OF JAPAN, LIMITED, resulting in a printed resin sheet (lower resin sheet) being obtained.

Subsequently, a transparent acrylonitrile sheet of 0.2 mm in thickness manufactured under a tradename “GECHRON” by Mitsui Chemicals, Inc. was subjected to pressure-vacuum forming as in Example 1, resulting in a sheet for a push button formed with projections (shaped sheet) being obtained.

Then, the shaped sheet was arranged on a jig or fixture so as to keep the projections facing down and then ultraviolet-cured resin manufactured under a tradename “UV 130L” by Nogawa Chemical Co., Ltd. was poured into the projections by means of an air dispenser and exposed to ultraviolet rays for 15 seconds at a distance of 15 cm by means of a high-pressure mercury lamp of 120 W/m, to thereby be cured. Then, an ultraviolet-cured adhesive manufactured under a tradename “UV 145B” by Nogawa Chemical Co., Ltd. was applied to the shaped sheet by means of an air dispenser. Then, the shaped sheet and lower resin sheet were laminated on each other through the adhesive to form a laminate, which was exposed through a top surface of each of key top elements to ultraviolet rays for 5 seconds at a distance of 15 cm using a high-pressure mercury lamp of 120 W/m, to thereby cure the adhesive, resulting in a key top member for a push button switch structure being obtained.

The resultant key top member was constructed in such a manner that the key top elements made of transparent photo-setting resin are each covered on top and side surfaces thereof with the transparent acrylonitrile sheet. Thus, the key top member permitted the design printed on a bottom surface of each of the key top elements to be observed through the transparent key top.

The procedure described in each of the above-described examples facilitated positional registration between the key top elements and the lower resin sheet, to thereby ensure positive bonding therebetween without causing any misregistration therebetween. Also, it permitted the adhesive for the lamination to be cured between the shaped sheet and the lower resin sheet, to thereby eliminate problems such as odor of the adhesive and sticking thereof due to projection of the adhesive from therebetween.

Such advantages of the present invention was proved by comparison between the above-described examples and the following comparative example in which Example 1 described above was substantially repeated except that the partial heating was not carried out.

COMPARATIVE EXAMPLE

A printed sheet having longitudinally and laterally extending lines printed in a lattice-like manner thereon was obtained as in Example 1. A die for heating the whole printed sheet including a top surface of each of key top elements and a pressure-vacuum forming mold for forming projections for the key top elements were vertically arranged in a vacuum forming machine so that an acrylic resin sheet and a polyester sheet were positioned on an upper die/mold member side and a lower die/mold member side, respectively. Then, the heating die and pressure-vacuum forming mold were adjusted to temperatures of 170° C. and 30° C., respectively. Under such conditions, the printed sheet was heated for 1 second on the heating die and then subjected to pressure-vacuum forming under a pressure of 5 kgf/cm$^2$ in the pressure-vacuum forming mold after 1 second, resulting in a sheet for a push button switch structure provided with projections (shaped sheet) being prepared.

Then, the shaped sheet was arranged on a jig or fixture so as to keep the projections facing down and then ultraviolet-cured resin manufactured under a tradename "UV 130L" by Nogawa Chemical Co., Ltd. was poured into the projections of 3 mm in height by means of an air dispenser and exposed to ultraviolet rays for 15 seconds at a distance of 15 cm by means of a high-pressure mercury lamp of 120 W/m, to thereby be cured. The resin thus cured was recessed by about 0.5 mm due to shrinkage thereof during the curing, therefore, the ultraviolet cured resin described above was further filled in the recess of the cured resin using the air dispenser and exposed to ultraviolet rays for 5 seconds at a distance of 15 cm using the high-pressure mercury lamp of 120 W/m, resulting in a key top member for a push button switch structure being manufactured.

In the key top member thus obtained, the key top element was formed on the top surface thereof with a lattice constituted by lines spaced from each other at intervals of 1 mm and having a width of 0.2 mm. A maximum distance between points of the lattice was as large as 1.45 mm. The whole top surface had distortion as large as 45%, to thereby lose its original configuration.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

The invention claimed is:

1. A method for manufacturing a key top member for a push button switch structure including key top elements, said method comprising the steps of:

providing a thermoplastic resin sheet having first portions, second portions, and a plurality of display sections printed on said first portions thereof so as to conform to outer configurations of said key top elements, wherein said first portions are adapted to constitute top surfaces of said projections corresponding to said display sections;

heating said second portions of said thermoplastic resin sheet so as to be softened using a heating die;

thereafter, introducing the heated thermoplastic resin sheet into a forming mold provided with protrusions for forming said projections so as to locate said first portions at a level substantially identical to that of a top surface of each of said protrusions of said forming mold;

shaping within said forming mold the heated thermoplastic resin sheet to provide said projections so as to form said thermoplastic resin sheet with said projections having configurations conforming to outer configurations of said key top elements; and securely arranging filler members made of photo-setting resin in said projections to constitute said key top elements in cooperation with said projections, wherein said shaping of the heated thermoplastic resin sheet includes stretching the heated second portions of said thermoplastic resin sheet without substantially stretching said first portions to thereby prevent deformation of said display sections previously printed and misregistration of printing thereon.

2. The method as defined in claim 1, wherein said arranging of the filler members includes pouring photo-setting resin in said projections after forming said resin sheet with said projections, and exposing the photo-setting resin to light, to thereby securely cure the photo-setting resin in said projections.

3. The method as defined in claim 2, further comprising the step of arranging an additional resin sheet under the cured photo-setting resin through an adhesive, whereby said filler members are surrounded by said thermoplastic resin sheet having the projections and said additional resin sheet while being vertically interposed therebetween.

4. The method as defined in claim 3, wherein said additional resin sheet has at least one display section formed thereon in a manner to be different from said display sections of said thermoplastic resin sheet having said projections.

5. The method as defined in claim 1, wherein said shaping of the heated thermoplastic resin sheet is carried out by pressure vacuum forming.

6. The method as defined in claim 5, wherein during said pressure vacuum forming, said first portions of said thermoplastic resin sheet are fixed and the heated second portions of said thermoplastic resin sheet are stretched by downwardly drawing to form a side and a bottom edging portion of each of said projections.

7. The method as defined in claim 1, wherein said forming mold is kept at a first temperature which is lower than a second temperature of said heating die.

8. The method as defined in claim 1, wherein during said heating of said thermoplastic resin sheet, said first portions of said thermoplastic resin sheet are kept at a first temperature and said second portions are heated to a second temperature sufficient to allow said second portions to be softened.

* * * * *